United States Patent Office 3,121,066
Patented Feb. 11, 1964

3,121,066
N-NITROSO GLYCOLURILS AND THEIR USE AS BLOWING AGENTS IN MAKING FOAMED THERMOPLASTIC POLYMERS
William P. ter Horst, Pikesville, Md., assignor to National Polychemicals, Inc., Wilmington, Mass., a corporation of Massachusetts
No Drawing. Filed Oct. 28, 1960, Ser. No. 65,615
13 Claims. (Cl. 260—2.5)

My invention relates to glycoluril derivatives, and particularly to a new class of blowing agents comprising the N-nitroso glycolurils of the formula:

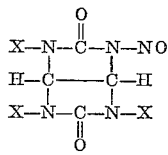

and its homologs and derivatives.

In this formula, X represents a member of the class consisting of hydrogen, the methylol radical and the nitroso radical.

A wide variety of cellular or foam-like solid materials is now produced by dispersing in a thermoplastic polymer a blowing agent which is dissociated by heating to give off bubbles of gas which expand the plastic material into a cellular structure. During or after the process, the plastic may be cured to an infusible state, or it may retain its thermoplastic property after cooling.

Since the action of the blowing agent in processes of the class described is purely mechanical, the criteria for selecting a suitable blowing agent for use with a particular thermoplastic polymer are largely physical, rather than chemical. In particular, a suitable blowing agent is selected on the basis of (1) dissociation at a convenient temperature, in the range in which the particular polymer is sufficiently plastic to be blown, to give off bubbles of an inert gas; (2) ease of dispersion of the blowing agent in the polymer to be blown; (3) sufficient vigor of the dissociation reaction to "blow" the polymer to a desired final density; (4) cost consistent with the end use of the finished cellular material; and (5) the absence of side effects inconsistent with the end use of the product. As to the latter, a deteriorating reaction between the solid polymer and the dissociation product would disqualify an otherwise satisfactory blowing agent, and in most instances an offensive odor, or even any noticeably characteristic odor, imparted to the finished product would be highly undesirable.

It is the object of my invention to provide a new class of blowing agents which will meet all of the above objectives, and in particular to provide a highly effective and extremely economical blowing agent, made from inexpensive starting materials by efficient and economical processes, which is eminently suited for the preparation of solid cellular materials for use where cost and freedom from odor are important, as, for example, in thermal, accoustical and electrical insulation and the like.

My invention is based on the discovery of the N-nitroso derivatives of glycoluril and its homologs and derivatives, of methods for preparing the same, and of the improved properties of these compounds as blowing agents for the thermoplastic polymers.

Glycoluril is a known compound which can be inexpensively prepared from glyoxal and urea by the process described in U.S. Patent No. 2,803,564.

In general, the process of preparing nitroso derivatives of glycoluril of our invention consists in reacting glycoluril with sodium nitrite in an aqueous nitric acid solution maintained at a low temperature. The temperature of the reaction and the use of nitric acid are both critical. At temperatures beyond 25 degrees, denitrososation takes place as rapidly as nitrososation, and the desired nitroso derivatives are not formed. If other acids such as sulfuric, hydrochloric or glacial acetic acid are used, nitroso-glycolurils are not formed, or at best are formed in very poor yields.

EXAMPLE I

The Preparation of Mono-N-Nitroso-Glycoluril

This preparation is based on the following reaction:

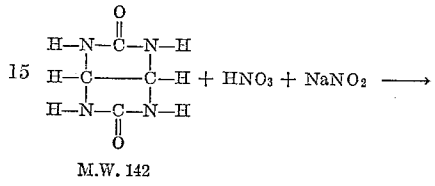

M.W. 142

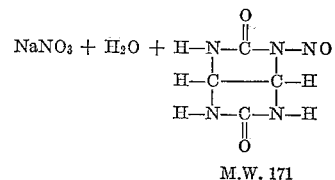

M.W. 171

The starting materials are glycoluril, either dry or as the equivalent amount of wet filter cake, 70 percent nitric acid, and sodium nitrite. The necessary apparatus consists of a 2,000 ml. flask, equipped with an efficient stirrer and a thermometer, and cooled externally with ice water.

In this reaction, both the starting material and the final product are insoluble. Accordingly, efficient agitation is important.

To the flask was added 160 grams of ice water. Then, 162 grams of 70 percent nitric acid (1½ moles+20 percent excess) was added with agitation. The solution was cooled to 10° C. 213 grams of glycoluril were added (1½ moles). The solution was agitated, with cooling, until a smooth white dispersion was obtained. The dispersion was thick, and remained thick during nitrosation.

In the course of 2½ hours was added a solution of 126 grams of sodium nitrite (1½ moles+20 percent excess) in 350 ml. of water, keeping the temperature at 12–15° C. As soon as nitrite was added, the dispersion turned yellow, and became gradually thicker and more yellow. If nitrite is added too fast, much foaming results and brown oxides of nitrogen escape. Towards the end of the reaction, however, these gasses are normal and to be expected, because 20 percent excess nitrite is used. The walls of the flask were washed down with 100 ml. of ice water.

After all the nitrite was added, the mixture was stirred one-half hour at 10–15° C., and then filtered under vacuum. The product filtered rapidly. The filter cake was washed with a liter of tap water, then twice with 100 ml. of acetone. The product was dried at room temperature. Either air-drying or vacuum drying may be employed. The yield was 246 grams of cream colored powder (96 percent of the theoretical). This powder had no melting point. When heated rapidly, it decomposed explosively. When heated slowly, it generated gas above 150° C. At about 210° C., the gas evolution was vigorous, and the material would "puff" at that temperature in air.

Mono-N-nitroso-glycoluril is apparently stable at 60° C. However, to insure its stability it is suggested that it be compounded with 5 percent of a silica gel such as Cab-O-Sil and 5 percent of a dessicant such as Microcel, a synthetic calcium silicate. The former makes the mixture free flowing, and both additives contribute to stability and to better dispersion in polyvinyl chloride, rubber, and other polymers.

EXAMPLE II

*The Preparation of N,N' Dinitroso Glycoluril*

This preparation is based on a reaction in which at least two of the N-hydrogens of glycoluril are replaced by nitroso groups.

35.5 grams of glycoluril were dispersed in 216 grams of 35 percent aqueous $HNO_3$. A small amount of a surfactant, Du Pont BQ, was added. In the course of six hours, a solution of 84 grams of $NaNO_2$ in 200 ml. of $H_2O$ was added, while the dispersion was maintained at 20–22° C. with stirring and external cooling. The yellow product was filtered and washed with water, and then dried to constant weight. The yield was 47 grams of a light yellow powder, 94 percent of the theoretical. The product decomposes, almost explosively, at 235° C. In this process it is advantageous to incorporate dimethylformamide or dimethyl acetamide, solvents for nitroso-glycoluril.

EXAMPLE III

*The Preparation of N-Methylol-N-Nitroso Glycoluril*

In this preparation, one of the N-hydrogens of mono-N-nitroso-glycoluril is replaced by the methylol group.

51.3 grams of Mono-N-nitroso glycoluril were dispersed in 200 ml. of $H_2O$ at room temperature. 100 grams of 37 percent aqueous formaldehyde and a few drops of conc. HCl were added, and the mixture was agitated at room temperature for four hours. The solid product, a light yellow powder, was filtered, washed with water, and air dried. The yield was 48.5 grams, 80.5 percent of the theoretical. It is believed that most of the loss in yield was due to mechanical losses in handling. This material decomposes less vigorously than N-nitroso-glycoluril.

EXAMPLE IV

*The Preparation of Poly-N-Methylol-Mono-N-Nitroso-Glycoluril*

This preparation involves the replacement of at least two N-hydrogens of mono-N-nitroso-glycoluril in the presence of excess formaldehyde.

A mixture of 51.3 grams of N-nitroso glycoluril, 200 ml. of water, 150 grams of 37 percent formaldehyde and 6 drops of concentrated hydrochloric acid was stirred and allowed to react for 144 hours. There was obtained 52.5 grams of yellow powder, which decomposes vigorously when heated, at 275° C.

In a similar manner polymethylol-N-nitrosoglycolurils can be obtained, using alkaline catalysts at a pH of about 9.0.

The more methylol groups are incorporated, the more hydrophyllic the blowing agent becomes, as will appear from the following example.

EXAMPLE V

*The Preparation of N-Nitroso-Trimethylol-Glycoluril*

In a three liter flask were mixed 171 grams of N-nitroso-glycoluril, 200 grams of water, and 100 grams of para-formaldehyde. The pH of the mixture was adjusted to 9.0 by addition of 16 ml. of 10 percent caustic soda solution. An exothermic reaction takes place. The nitroso-glycoluril gradually dissolves. The mass was kept at 55–60° C. for a period of one hour, while agitating, and the reaction product dried, yielding tri-methylol-N-nitroso-glycoluril, a viscous light yellow liquid that is water soluble. This material has been tested with polyvinyl chloride, and yielded a low density polyvinyl chloride foam. The material may be further dried under high vacuum and thus yields a light yellow, solid, resinous product that is an excellent blowing agent.

I have also found mechanical mixtures of N-nitroso-glycolurils and para-formaldehyde or formaldehyde donors to be good blowing agents. Of the formaldehyde donors, I have found that hexamethylene tetramine makes a particularly good blowing agent.

I have found that N-nitroso derivatives of heterocyclic compounds formed by the reaction of two molecules of urea with other dialdehydes and with diketones and keto-aldehydes also make good blowing agents. For example, such chemicals as

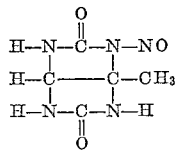

and

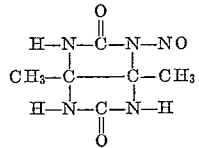

are in this class. The former may be made by the nitrosation of the reaction product of urea and methyl glyoxal, and the latter may be made by the nitrosation of the reaction product of urea and dimethyl glyoxal. Similar chemicals can be made from acetyl acetone and acetonyl acetone. The following is a specific example of a blowing agent made from a higher dialdehyde:

EXAMPLE VI

*The Preparation of N-Nitroso-Glutaraldehydeuril*

120 grams of urea were dissolved in 125 grams of water, and 25 grams of 37 percent hydrochloric acid was added. To this solution, at 55° C., was added, in the course of one hour, with agitation, 200 grams of 25 percent glutaraldehyde. An exothermic reaction takes place. The temperature was maintained at 55–60° C. The mass was cooled and amylene-glycoluril isolated by filtration and drying. The yield was 34 grams. 18.4 grams of glutaraldehydeuril was dispersed in 80 grams of 35 percent nitric acid at about 10° C., and gradually there was added, with agitation and external ice water cooling, a solution of 28 grams of sodium nitrite in 60 grams water. A light yellow ntroso-compound was thus obtained which is an excellent blowing agent. The material has no melting point. When heated, it gasses above 100° C.

The cellular products produced by blowing are so varied, and the selection of a suitable thermoplastic polymer for producing a desired cellular end product is so well understood, that no purpose would be served by attempting to list the endless possible permutations of polymers and mixtures of polymers, with or without inert filler materials, that are now employed for this purpose or that will appear on the scene as the art develops. Moreover, as is known in the art, the pairing of a particular plastic with a suitable blowing agent depends on physical properties, such as the thermal flow range of the plastic, relative to the dissociation temperature of the blowing agent. Accordingly, chemical generalization as to the particular polymeric materials suitable for use with each nitroso glycoluril cannot be made. Therefore, while numerous examples of such materials are given below, they are not to be thought of as limiting or defining my invention, since those skilled in the art are well familiar with the behavior of polymers at elevated temperature, and the designation of a decomposition temperature for a particular nitroso glycoluril of my invention will readily bring to mind polymeric compositions in which it would suitably be used.

Mono-N-nitroso-glycoluril has been tested as a blowing agent in polyvinyl chloride, natural rubber, butadiene-styrene rubbers, Neoprene and butyl rubbers, and in polyethylene, and was found to yield low-density polyvinyl chloride and rubber foams. Its specific performance as a blowing agent will be best appreciated from the following quantitative examples:

EXAMPLE VII

|  | Parts by weight | |
|---|---|---|
|  | A | B |
| MB G-1 | 264.75 | 264.75 |
| Mono-N-nitroso-glycoluril | 7.0 | 2.8 |
| Urea | 2.2 | 2.2 |
| Benzothiazyl disulfide | 0.7 | 0.7 |
| Sulfur | 3.0 | 3.0 |
| Silica |  | 4.2 |
|  | 277.65 | 277.65 |

The above formulations were cured under the conditions given in the following table, resulting in cellular materials having the properties indicated:

TABLE VI

| Formulation | Cure Time, minutes | Cure Temp., °F. | Apparent Density, g./cc. |
|---|---|---|---|
| A | 8 | 335 | .36 |
|  | 9 | 335 | .44 |
| B | 8 | 335 | .56 |
|  | 9 | 335 | .58 |

The composition represented as MB G-1 in the above formulations has the following composition:

| | Pts. by weight |
|---|---|
| SBR #3110 | 100.0 |
| Butaprene L | 15.0 |
| Picco 100 | 10.0 |
| Hi Sil 233 | 30.0 |
| Hard clay | 67.5 |
| Unitane UR 540 | 15.0 |
| Zinc oxide | 5.0 |
| Circo light oil | 15.0 |
| Diethylene glycol | 1.25 |
| Phthalic anhydride | 1.0 |
| Octamine | 1.0 |
| Stearic acid | 4.0 |
|  | 264.75 |

SBR #3110 is a copolymer of butadiene and styrene containing approximately 23.5 percent by weight of styrene. Butaprene L is a high styrene resin containing 80–85 parts of styrene and 15–20 parts of butadiene by weight. Picco 100 is a para coumaroneindene resin used as a plasticizer, softener and reinforcer. Hi Sil 233 is a reinforcing grade silica. Unitane UR 540 is rutile titanium dioxide. Circo Light Oil is a light colored naphthenic oil used as a softener. Octamine is a rubber anti-oxidant.

EXAMPLE VIII

|  | Parts by weight | |
|---|---|---|
|  | A | B |
| MB G-1 | 264.75 | 264.75 |
| Mono-N-nitroso-glycoluril | 7.0 | 2.8 |
| Benzothiazyl disulfide | 1.0 | 1.0 |
| Di-ortho-tolylguanidine | 0.3 | 0.3 |
| Sulfur | 3.0 | 3.0 |

The results of curing the above formulations are given in Table VII below:

TABLE VII

| Formulation | Cure Time, minutes | Cure Temp., °F. | Apparent Density, g./cc. |
|---|---|---|---|
| A | 8 | 335 | .31 |
|  | 9 | 335 | .38 |
| B | 8 | 335 | .51 |
|  | 9 | 335 | .49 |

EXAMPLE IX

Mono-N-nitroso-glycoluril was evaluated in a low-gel-temperature plastisol by means of the following formulation:

| | Parts by weight |
|---|---|
| Geon 121 | 100.0 |
| Tetraflex R-122 | 90.0 |
| Dyphos | 5.0 |
| Mono-N-nitroso-glycoluril | 5.0 |

Geon 121 is a polyvinyl chloride resin. Tetraflex R-122 is a mixed ester butyl-octyl phthalate plasticizer for poly (vinyl chloride) resins. Dyphos is an antioxidant stabilizer consisting of a dibasic lead salt of phosphorous acid.

The above formulation was expanded for five minutes at the various temperatures indicated in the following table, resulting in a light brown cellular material of the apparent densities indicated:

TABLE VIII

Temperature, °F.:      Apparent density, lb./ft.$^3$
360 ------------------------------------ 24.25
380 ------------------------------------ 14.25
400 ------------------------------------ 12.5

EXAMPLE X

Mono-N-nitroso-glycoluril was evaluated as a blowing agent in a polyvinyl chloride sheeting stock by means of the following formulation:

| | Parts by weight |
|---|---|
| Geon 101 EP | 100.0 |
| Dioctyl phthalate | 55.0 |
| Santicizer 160 | 10.0 |
| Paraplex G-62 | 5.0 |
| Stearic acid | 0.5 |
| Calcium Stearate | 0.5 |
| Ferro 1825 | 3.0 |
| Mono-N-nitroso-glycoluril | 5.0 |

Geon 101 EP is a grade of polyvinyl chloride resin. Santicizer 160 is butyl-benzyl-phthalate. Paraplex G-62 is a polyester plasticizer stabilizer for vinyl compounds. Ferro 1825 is a commercially available mixture of cadmium and barium fatty acid soaps having a high cadmium ratio and including an organic inhibitor.

This formulation was expanded for five minutes at the temperatures indicated below, resulting in a cellular material having the following apparent densities:

TABLE IX

Temperature, °F.:      Apparent density, lb./ft.$^3$
380 ------------------------------------ 24.5
400 ------------------------------------ 15

N,N'dinitroso glycoluril is a particularly useful blowing agent in rubbers, and in high melting plastics such as polyethylene, polypropylene, nylon, Lexan, Penton, and the like. Its behavior as a blowing agent will best be appreciated by a study of the following detailed examples:

EXAMPLE XI

|  | Parts by weight | |
|---|---|---|
|  | A | B |
| MB G-1 | 264.75 | 264.75 |
| Urea | 2.2 | 2.2 |
| Benzothiazyl disulfide | 0.7 | 0.7 |
| Sulfur | 3.0 | 3.0 |
| N,N' dinitroso glycoluril | 7.0 | 3.1 |

The above formulations were cured in the manner indicated in Table X below with the results indicated:

TABLE X

| Formulation | Cure Time, minutes | Cure Temp., °F. | Apparent Density, g./cc. |
|---|---|---|---|
| A | 9 | 335 | .37 |
|   | 8 | 335 | .34 |
| B | 9 | 335 | .52 |
|   | 8 | 335 | .46 |

EXAMPLE XII

| | Parts by weight |
|---|---|
| MB G-1 | 264.75 |
| Benzothiazyl disulfide | 1.0 |
| Di-orotho-tolylguanidine | 0.3 |
| Sulfur | 3.0 |
| N,N-dinitroso-glycoluril | 7.0 |

The above formulation was expanded for five minutes at the temperatures indicated below, with the indicated results:

TABLE XI

| Cure Time, Min. | Cure Temp., °F. | Apparent Density, g./cc |
|---|---|---|
| 9 | 335 | .28 |
| 8 | 335 | .27 |

EXAMPLE XIII

Mono-N-nitroso glycoluril, the nitroso derivative prepared as described in Example I, a mono-N-methylol-N-nitroso-glycoluril prepared as described in Example III, and poly-N-methylol-mono-N-nitroso glycoluril, prepared as described in Example IV, were evaluated in a pressure blown sponge by means of the following formulations:

|  | Parts by weight | | | |
|---|---|---|---|---|
|  | A | B | C | D |
| MB G-1 | 264.75 | 264.75 | 264.75 | 264.75 |
| Mono-N-nitroso glycoluril | 7.0 |  |  |  |
| Example IV product |  | 7.0 |  |  |
| Mono-N-methylol derivative |  |  | 7.0 |  |
| Poly-N-methylol derivative |  |  |  | 7.0 |
| Benzothiazyldisulfide | 1.0 | 1.0 | 1.0 | 1.0 |
| Di-ortho-tolylguanidine | 0.3 | 0.3 | 0.3 | 0.3 |
| Sulfur | 3.0 | 3.0 | 3.0 | 3.0 |

These formulations were cured at 335° F. for the times given in Table XII below, with the results indicated.

TABLE XII

| Formulation | Cure Time, Min. | Apparent Density, g./cc. |
|---|---|---|
| A | 8 | .267 |
|   | 9 | .332 |
| B | 8 | .272 |
|   | 9 | .302 |
| C | 8 | .268 |
|   | 9 | .327 |
| D | 8 | .257 |
|   | 9 | .300 |

EXAMPLE XIV

The four blowing agents used in Example XIII were evaluated in a low temperature gel plastisol by means of the following formulations:

|  | Parts by weight | | | |
|---|---|---|---|---|
|  | A | B | C | D |
| Geon 121 | 100.0 | 100.0 | 100.0 | 100.0 |
| TETRAFLEX R-122 | 90.0 | 90.0 | 90.0 | 90.0 |
| Dyphos | 5.0 | 5.0 | 5.0 | 5.0 |
| Mono-N-nitroso-gylcoluril | 5.0 |  |  |  |
| Example IV product |  | 5.0 |  |  |
| Mono-N-methylol derivative |  |  | 5.0 |  |
| Poly-N-methylol derivative |  |  |  | 5.0 |

These formulations were expanded for five minutes at the temperatures given in Table XIII below, with the indicated results.

TABLE XIII

| Temperature, °F. | Resultant Apparent Densities, lbs./ft.³ | | | |
|---|---|---|---|---|
|  | A | B | C | D |
| 340 | 32.75 | 22.5 | 37.50 | 35.0 |
| 360 | 32.75 | 20.25 | 34.30 | 30.0 |
| 380 | 26.25 | 18.0 | 23.0 | 10.5 |
| 400 | 16.50 | 15.0 | 14.75 | 12.0 |

The cellular products prepared in accordance with the above examples are free of any odor imparted by the dissociation products of the blowing agent, indicating that the use of the compounds of my invention will solve the previously troublesome problem of strong or offensive odors imparted by prior blowing agents of the same economic class.

While I have given various detailed examples and illustrations of the new compounds of my invention, of the manner of their preparation, and of their utility as blowing agents, it will be apparent to those skilled in the art upon reading my description that other compounds within the class defined by the general formula:

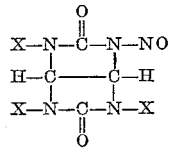

are within the scope of my invention, since they obviously will have homologous properties and can be prepared by methods similar to those described. In particular, the homologs, analogs, and derivatives of the nitroso glycolurils described will have similar properties, and the halogen derivatives may also be expected to have homologous properties. Accordingly, all such compounds and derivatives as are represented by the more general formula:

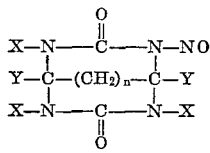

where X is a member of the class consisting of hydrogens, the methylol radical and the nitroso radical, Y is a member of the class consisting of hydrogen and the lower alkyl radicals, and $n$ is an integer from 0 to 6, are deemed to be within the scope of my invention, which is not to be limited by the detailed examples and illustrations given, but only by the spirit and scope of the following claims.

Having thus described my invention, what I claim is:
1. Mono-N-nitroso glycoluril.
2. N-nitroso-trimethylol-glycoluril.
3. A chemical of the formula

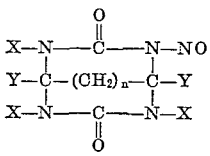

where X is a member of the class consisting of hydrogen, the methylol radical and the nitroso radical and combinations thereof, Y is a member of the class consisting of hydrogen and the lower alkyl radicals and combinations thereof, and $n$ is an integer from 0 to 6.

4. A chemical as defined in claim 3 wherein $n$ is 0.
5. A composition capable of blowing thermoplastic compositions which comprises a chemical as defined in claim 3 admixed with a formaldehyde donor.
6. A composition as defined in claim 5 wherein $n$ is 0 and wherein the formaldehyde donor is hexamethylene tetramine.
7. N-nitroso glutaraldehydeuril.
8. N,N′ dinitroso glycoluril.
9. N-methylol-N-nitroso glycoluril.
10. Poly-N-methylol-mono-N-nitroso glycoluril.
11. The method of making chemicals of the formula

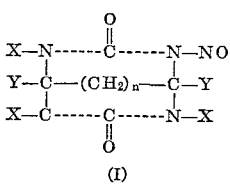

where X is selected from the class consisting of hydrogen, nitroso radicals and combinations thereof, Y is a member of the class consisting of hydrogen, lower alkyl radicals, and combinations thereof, and $n$ is an integer from 0 to 6 comprising: reacting a chemical of the formula:

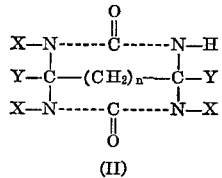

with nitrosoating agent in an aqueous nitric acid solution.

12. A blown plastic producing composition consisting of 100 parts by weight of a polymeric thermoplastic composition and from 1 to 15 parts of a blowing agent defined by the formula:

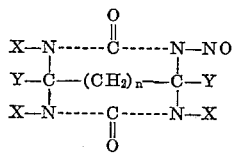

where X is a member of the class consisting of hydrogen, the methylol radical and the nitroso radical and combinations thereof, Y is a member of the class consisting of hydrogen and the lower alkyl radicals and combinations thereof, and $n$ is an integer from 0 to 6.

13. A composition as defined in claim 12 wherein the blowing agent is mono-N-nitroso glycoluril.

References Cited in the file of this patent
UNITED STATES PATENTS

| | | |
|---|---|---|
| 2,654,763 | Adkins | Oct. 6, 1953 |
| 2,776,979 | Michels | Jan. 8, 1957 |
| 2,891,017 | Kern | June 16, 1959 |
| 2,893,995 | Mahan | July 7, 1959 |
| 2,904,522 | Cotlin | Sept. 15, 1959 |
| 2,924,605 | Hughes | Feb. 9, 1960 |

OTHER REFERENCES

Devins et al.: "Chemical Abstracts," volume 42, pages 5704–5 (1941).